United States Patent [19]

Geyer, Jr. et al.

[11] 4,275,195

[45] * Jun. 23, 1981

[54] PROCESS AND APPARATUS FOR EXPEDITING THE MERCERIZATION OF ALKALI CELLULOSE

[75] Inventors: Charles J. Geyer, Jr., Berwyn; Ben E. White, Wayne, both of Pa.

[73] Assignee: Fiber Associates, Berwyn, Pa.

[*] Notice: The portion of the term of this patent subsequent to Aug. 7, 1996, has been disclaimed.

[21] Appl. No.: 41,895

[22] Filed: May 24, 1979

Related U.S. Application Data

[63] Continuation-in-part of Ser. No. 576,200, May 9, 1975, Pat. No. 4,163,840.

[51] Int. Cl.$^3$ .............................. C08B 1/08; C08B 1/10
[52] U.S. Cl. ........................................ 536/101; 8/125
[58] Field of Search ............................. 536/101; 8/125

[56] References Cited

U.S. PATENT DOCUMENTS

| | | | |
|---|---|---|---|
| 2,143,863 | 1/1939 | Collings et al. | 536/101 |
| 2,149,178 | 2/1939 | Morton | 536/101 |
| 2,373,374 | 4/1945 | Bierwirth | 536/56 |
| 2,499,010 | 2/1950 | Weeldenburg | 536/101 |
| 2,558,066 | 6/1951 | Wedler | 536/101 |
| 2,614,102 | 10/1952 | Schlosser et al. | 536/101 |
| 2,991,281 | 7/1961 | Bradshaw et al. | 536/101 |
| 3,053,829 | 9/1962 | Yehling | 536/101 |
| 3,600,379 | 8/1971 | Sihtola et al. | 536/60 |
| 3,728,330 | 4/1973 | Sihtola et al. | 536/60 |
| 3,885,575 | 5/1975 | Parker et al. | 536/2 |
| 3,915,959 | 10/1975 | Goheen et al. | 536/101 |
| 4,163,840 | 8/1979 | Geyer et al. | 536/101 |

*Primary Examiner*—Ronald W. Griffin
*Attorney, Agent, or Firm*—Miller & Prestia

[57] ABSTRACT

A process and apparatus for making alkali cellulose having a desired predetermined degree of polymerization in which cellulose is steeped in an alkali hydroxide bath, generally 17–25% sodium hydroxide, and then passed through an RF treatment chamber where it is subjected to an RF energy field, to produce a controlled depolymerization thereof. Upon emergence from the steeping bath, the cellulose passes to an excess solution removing means, such as one or a series of pairs of nip rolls where the excess solution is expressed from the cellulose and the amount of absorbed alkali is controlled. Preferably, the excess solution is recovered and returned to the steeping baths. A second, lower concentration, steep bath may follow the RF treatment chamber.

7 Claims, No Drawings

PROCESS AND APPARATUS FOR EXPEDITING THE MERCERIZATION OF ALKALI CELLULOSE

This is a continuation-in-part of our application, Ser. No. 576,200, filed May 9, 1975, now U.S. Pat. No. 4,163,840, issued Aug. 7, 1979. The specification and drawing of application Ser. No. 576,200 are incorporated herein by reference.

In the parent application, the process and apparatus are disclosed and claimed wherein alkali cellulose in sheet form is subjected to a two stage caustic steeping process and mercerization of the alkali cellulose is effectively expedited, in a novel and unobvious way, by the utilization of RF energy.

It is the RF mercerization of alkali cellulose upon which patentability in the parent case is based.

However, while it would be clear to one skilled in the art that RF induced mercerization could be similarly utilized to expedite mercerization of alkali cellulose in other processes, this extension of the invention to encompass the use of RF mercerization in other processes was not claimed in the parent application.

The purpose of the present application is to disclose expressly that such RF mercerization would be similarly useful to reduce the treatment time required for mercerization of alkali cellulose in other forms, such as alkali cellulose crumb, alkali cellulose as used in sheet form batch-steeping processes, and so forth.

In each case, the RF mercerization process would involve subjecting the cellulose, converted to alkali cellulose by steeping in a caustic solution, to an RF treating process.

In the case of alkali cellulose crumb, such process may comprise, for example, conveying of such crumb on a belt conveyor through an RF mercerization chamber, in the course of which the degree of polymerization of the alkali cellulose may be reduced, for example, from about 700–1000 to approximately 300–450, just as in the two stage continuous sheet steeping process of the parent application. Similarly, the alkali cellulose crumb may thereafter be resteeped and/or compressed for removal of residual caustic steeping solution.

Still further, the invention may comprise conveying batch-steeped alkali cellulose sheet through an RF mercerization chamber adapted to expose the extended surface area of the sheet to RF energy to expedite mercerization thereof. Such exposure may be accomplished not only by conveying the sheet passed an RF source but, alternatively, by a mounting of the RF source in a manner to move and pass over the extended surface area of the sheet alkali cellulose to be treated.

Regardless of the form of alkali cellulose or the nature of the steeping process, it is apparent that the present specification and claims are intended expressly to cover any extension of the invention wherein an RF energy source is utilized to expedite mercerization of alkali cellulose and thereby to facilitate more rapid processing of alkali cellulose in preparation for ultimately spinning the alkali cellulose into a rayon synthetic fiber.

While this invention has been disclosed with respect to specific embodiments thereof, it is not limited to those embodiments disclosed and discussed but rather the appended claims are intended to be construed to encompass all such forms of the invention which may be made by those skilled in the art without departing from the true spirit and scope thereof.

Accordingly, we claim:

1. A process for mercerizing alkali cellulose comprising the step of:
    exposing said alkali cellulose to RF energy for a period of time and at an energy input level sufficient to depolymerize said alkali cellulose to a desired predetermined degree of polymerization.

2. The process as recited in claim 1, wherein said alkali cellulose is in the form of crumbs.

3. The process as recited in claim 2, wherein said alkali cellulose crumbs are conveyed through said RF energy field.

4. The process as recited in claim 1, wherein said alkali cellulose is in the form of sheets.

5. The process as recited in claim 4, wherein said sheets of alkali cellulose are conveyed through an RF energy field.

6. The process as recited in claim 4, wherein a source of RF energy is adapted to move and pass over the surface of said alkali cellulose sheets.

7. In the process of forming alkali cellulose of a predetermined degree of polymerization less than that of cellulose prior to treatment for subsequent conversion into a rayon spinning solution the step comprising:
    depolymerizing said alkali cellulose to a desired degree by exposing said alkali cellulose to RF energy for a period of time and at an energy input level sufficient to accomplish said depolymerization.

* * * * *

UNITED STATES PATENT AND TRADEMARK OFFICE
CERTIFICATE OF CORRECTION

PATENT NO. : 4,275,195
DATED : June 23, 1981
INVENTOR(S) : Charles J. Geyer, Jr.
Ben E. White It is certified that error appears in the above—identified patent and that said Letters Patent is hereby corrected as shown below:

Column 1, line 47, "expediate" should read --expedite--.

Column 2, line 43, after "treatment" insert --and suitable--.

Signed and Sealed this

Eighth Day of September 1981

[SEAL]

Attest:

GERALD J. MOSSINGHOFF

Attesting Officer  Commissioner of Patents and Trademarks